Dec. 16, 1947.  B. T. GROBOWSKI  2,432,621

WHEEL ATTACHING MEANS

Filed Feb. 20, 1946

INVENTOR.
Benny T. Grobowski.

BY

Corbett, Mahoney & Miller

ATTORNEYS

Patented Dec. 16, 1947

2,432,621

UNITED STATES PATENT OFFICE 2,432,621

WHEEL ATTACHING MEANS

Benny T. Grobowski, Newark, Ohio, assignor to The E. T. Rugg Company, Newark, Ohio, a corporation of Ohio Application February 20, 1946, Serial No. 649,075

3 Claims. (Cl. 301—112)

My invention relates to a wheel attaching means. It has to do, more particularly, with a novel wheel and axle structure which is particularly useful on lawn mowers, although it is not necessarily limited thereto.

Lawn mower wheels are most commonly cast from metal. The wheels are usually cast with a hub that provides a bearing sleeve extending completely through the wheel to the outside thereof. The axle is passed through the bearing sleeve and extends outwardly beyond the hub so that it is necessary to provide a retaining nut on the outer end of the axle, resulting in an unsightly structure. Usually, a hub cap is provided for covering this unsightly structure, but the hub cap itself is unsightly and detracts from the symmetry of the wheel.

One of the objects of my invention is to provide a wheel and axle structure which is of such a nature that the outer end of the axle will not be exposed and there will be no need for providing an unsightly hub cap at the outer surface of the wheel.

Another object of my invention is to provide a wheel and axle structure of the type indicated which is of such a nature that the outer surface of the wheel may present a continuous, uninterrupted, symmetrical surface which can be finished, for example by a polishing operation, so that it will be very pleasing in appearance.

Another object of my invention is to provide a wheel and axle structure which is not only attractive as indicated above but which is of such a nature that the wheel may be easily and quickly applied to or removed from the mower.

Another object of my invention is to provide a wheel and axle structure of the type indicated which is of a rugged nature and will effectively maintain the wheel in position on the mower.

Another object of my invention is to provide a wheel and axle structure of the type indicated which will not only have the desirable qualities mentioned above, but will be of a relatively simple and inexpensive structure.

The preferred embodiment of my invention is illustrated in the accompanying drawing wherein.

Figure 1:
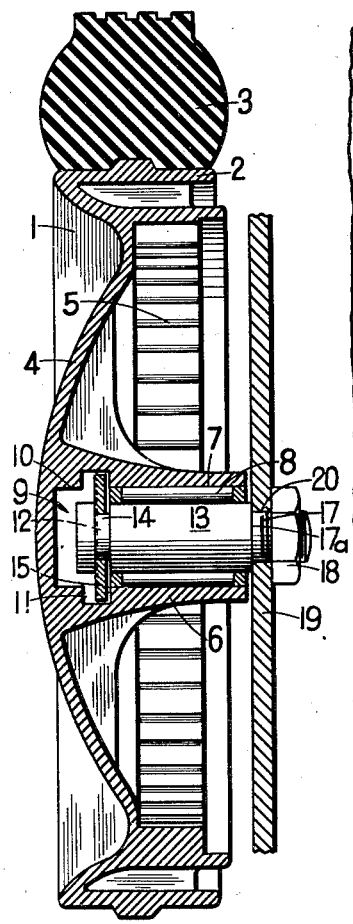
Figure 1 is a sectional view taken along line 1—1 of Figure 2 through my wheel and axle structure.
Figure 2:
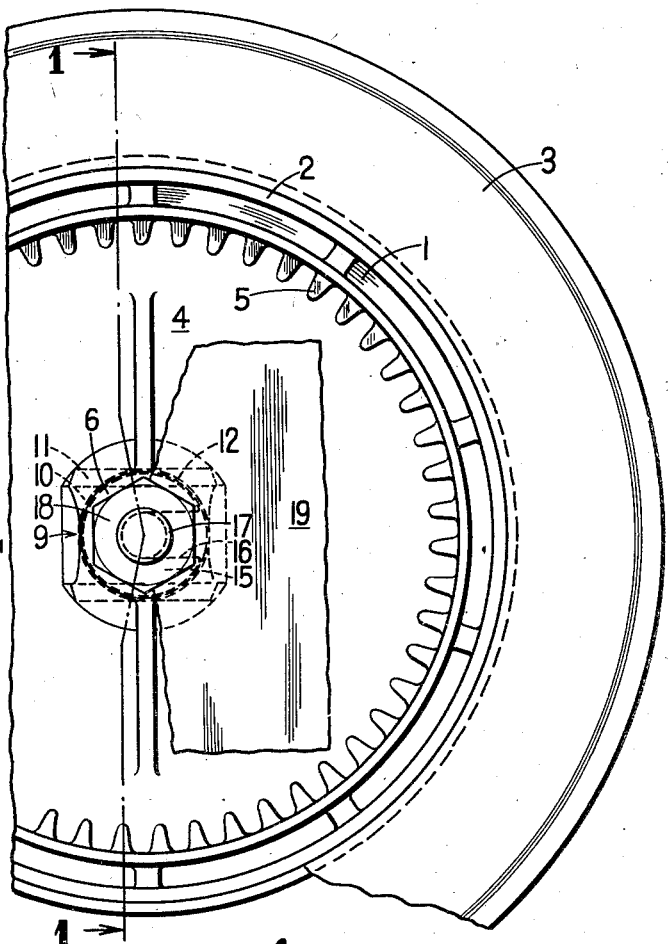
Figure 2 is an inside elevational view of a major part of the wheel structure.
Figure 3:
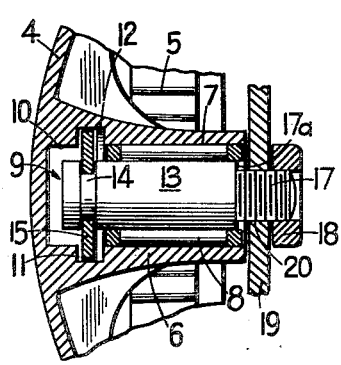
Figure 3 is a detail in section of the hub and axle structure.

With reference to the drawing, I have illustrated a wheel and axle structure which embodies the features of my invention. However, it is to be understood that the structure shown is for illustrative purposes and that modifications may be made without departing from the scope of my invention.

The structure comprises a wheel 1 which is preferably in the form of a single casting. I prefer to cast the wheel of aluminum, but other materials may be used. The wheel includes a disc-like body that has on its periphery an integral rim 2 upon which is preferably mounted a rubber tire 3. The wheel is so formed as to present a continuous uninterrupted symmetrical surface 4 which may be finished in an attractive manner. If the wheel is cast from aluminum, this surface may be highly polished. The wheel is also cast with an inner integral ring gear 5 by means of which it may be rotated when mounted on a mower.

As indicated, the outer surface of the wheel is free of any hub or unsightly projection. However, the inner surface of the wheel carries a centrally disposed inwardly projecting hub 6 which is cast integral therewith. Thus, the hub includes an inner sleeve 7 which may be machined easily and accurately to receive the roller bearing 8.

The hub 6 is provided at the inner surface of the wheel with a transverse slot 9 which is T-shaped in cross-section. This slot extends diametrically through the hub and has both ends open. The slot includes the narrow part 10 and the wide part 11. Midway between the ends of the slot 9 and communicating with the inner side of the wide part 11 of the slot is a circular recess 12 which is formed in the hub concentric with the bearing sleeve 7 and at the outer end thereof.

Figure 4:
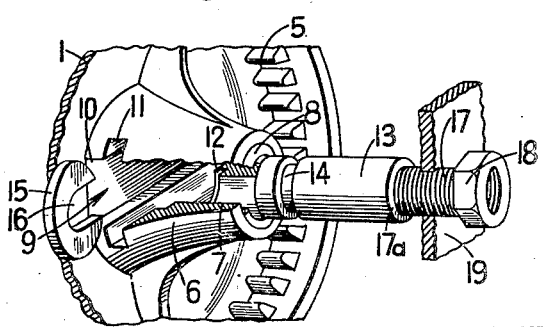
Figure 4 is a detail in perspective of the hub and axle structure.

A headless stub axle 13 is provided for insertion into the wheel hub. The axle 13 is provided at a point spaced slightly from its outer end with an annular groove 14 for receiving a retaining washer 15. As shown best in Figure 4, this washer is of substantially U-form, being provided with a notch 16 to permit the washer to be inserted into the annular groove 14 so that it will straddle the axle. The inner end of the axle 13 is provided with a reduced threaded extremity 17 which results in the formation of a shoulder 17a. The extremity 17 is adapted to receive a clamping nut 18.

The wheel and axle structure may be mounted on a suitable support, for example, on the plate 19 of a lawn mower frame. This plate is provided with an opening 20 for receiving the extremity 17 of the axle.

Before mounting the wheel and axle structure on the plate 19, the roller bearing is inserted in the hub 6. The stub axle 13 is inserted into the roller bearing 8 so that its outer end will project through the bearing. The extreme outer end of the axle will be extended into the narrow portion 10 of slot 9 to bring the annular groove 14 in the axle in alignment with the wide part 11 of the slot 9. The retaining washer 15 is then passed through one end of the wide part 11 of the slot into the hub until it is positioned in the groove 14 in straddling relationship to the axle 13. The axle, which now carries the wheel, is next positioned on the plate 19. To do this, the threaded extremity 17 of the axle is passed through the opening 20 and the nut 18 is threaded thereon and is drawn tightly against the plate 19. This will cause the axle 13 to be pulled inwardly through the sleeve 7 until the retaining washer 15 is drawn into and is held in the annular recess 12. Continued tightening of the nut 18 will draw the hub 6 towards the plate 19 until the shoulder 17a of axle 13 contacts plate 19. Thus, plate 19 will be clamped between shoulder 17a and nut 18 and, consequently, the axle 13 will be non-rotatably mounted on the plate. The distance between shoulder 17a and washer 15 is greater than the length of sleeve 7 so that there will be a slight clearance between the inner end of hub 6 and the plate 19 and between washer 15 and the adjacent flat annular surface of recess 12. Thus, the wheel will be free to rotate on the stationary axle. However, the washer 15 will prevent the wheel from pulling off of the axle due to the fact that the washer 15 and the recess 12 in which it snugly fits are of greater diameter than sleeve 7. The washer 15 rides freely on the stationary axle 13 and may or may not rotate with the wheel. It will not become displaced from the axle, due to the fact that it is disposed in the annular recess 12 and radial movement relative to the axle will be precluded. The only way the washer can be removed is to remove the axle from the plate 19 and force the axle outwardly until the washer is in alignment with the part 11 of slot 9.

It will be apparent from the above description that I have provided a wheel and axle structure which is of such a nature that the wheel will be free of any unsightly projections on its outer surface and, therefore, will be of more pleasing appearance. The structure is of such a nature that the wheel may be easily and quickly mounted on the axle or removed therefrom. Furthermore, the axle may be quickly and easily attached to or detached from a suitable support such as the frame of a lawn mower. The wheel and axle structure is rugged and will effectively maintain the wheel in position on the mower. Although the structure has the advantages mentioned above, it is simple and can be produced at a low cost.

Various other advantages will be apparent from the preceding description, the drawing and the following claims.

Having thus described my invention, what I claim is:

1. A wheel and axle structure comprising a wheel having a main body portion, a hub on the inner surface of said body portion, said hub having a bearing sleeve formed therein, an axle positioned within the hub, said axle having an annular groove in its periphery at a point spaced from the outer end thereof, a slot of T-cross-section extending transversely into the hub, and a wheel retaining washer of U-form adapted to be inserted through the wide part of the slot into said groove and in straddling relationship to said axle, and a recess for receiving and retaining said washer formed at the outer end of said sleeve and communicating with the wide part of said slot, said washer and said recess being of greater diameter than said sleeve.

2. A structure according to claim 1 wherein the inner end of said axle is provided with a reduced threaded extremity and has a clamping shoulder for cooperating with a clamping nut threaded on said extremity, the distance between said shoulder and said annular groove being greater than the length of said sleeve.

3. A wheel and axle structure comprising a wheel having a main body portion with a hub thereon, said hub having a bearing sleeve formed therein, an axle positioned within the sleeve, said axle having an annular groove in its periphery at a point spaced from the end thereof, a slot of T-cross-section extending transversely into the hub, a wheel-retaining washer of U-form adapted to be inserted through the wide part of the slot into said groove and in straddling relationship to said axle, and a recess for receiving and retaining said washer formed at the end of said sleeve and communicating with the wide part of said slot, said washer and said recess being of greater diameter than said sleeve.

BENNY T. GROBOWSKI.

REFERENCES CITED

The following references are of record in the file of this patent:

UNITED STATES PATENTS

| Number | Name | Date |
|---|---|---|
| 751,635 | Gustafson | Feb. 9, 1904 |
| 1,226,127 | Slaughter | May 15, 1917 |
| 1,596,938 | Moore et al. | Aug. 24, 1926 |
| 1,643,460 | Jones | Sept. 27, 1927 |
| 2,136,155 | Spicacci | Nov. 8, 1938 |
| 2,161,210 | Waalkes | June 6, 1939 |